US010983554B2

(12) United States Patent
Vincent et al.

(10) Patent No.: US 10,983,554 B2
(45) Date of Patent: Apr. 20, 2021

(54) METHOD AND SYSTEM FOR CLOCK SYNCHRONIZATION BASED ON TIME BASED CONTROL

(71) Applicant: Wipro Limited, Bangalore (IN)

(72) Inventors: Jimmy Vincent, Ammadam (IN); Basil Joseph, Ernakulam (IN)

(73) Assignee: Wipro Limited, Bangalore (IN)

( * ) Notice: Subject to any disclaimer, the term of this patent is extended or adjusted under 35 U.S.C. 154(b) by 214 days.

(21) Appl. No.: 16/370,904

(22) Filed: Mar. 30, 2019

(65) Prior Publication Data

US 2020/0264653 A1 Aug. 20, 2020

(30) Foreign Application Priority Data

Feb. 15, 2019 (IN) ............................ 201941006169

(51) Int. Cl.
*G06F 1/12* (2006.01)
*G06F 1/14* (2006.01)

(52) U.S. Cl.
CPC . *G06F 1/12* (2013.01); *G06F 1/14* (2013.01)

(58) Field of Classification Search
CPC ..... G06F 1/12; G06F 1/14; G06F 1/10; G06F 5/06; G06F 13/1689; G06F 1/08; G06F 1/04; G06F 1/3202; G06F 9/4825; G06F 11/0757; G06F 11/3419; G11C 7/22
See application file for complete search history.

(56) References Cited

U.S. PATENT DOCUMENTS 8,072,838 B2 * 12/2011 Lin ........................ G11C 7/222 365/233.1
8,836,389 B2 9/2014 Vandepeas
2001/0052808 A1 * 12/2001 Hamamoto ............. H03L 7/091 327/291
2002/0008586 A1 * 1/2002 Nakamichi ............. H03L 7/183 331/16

(Continued)

OTHER PUBLICATIONS

Kim, H.Y, "Modeling and Tracking Time-Varying Clock Drifts in Wireless Networks", Georgia Institute of Technology, 2014, 129 pages.

(Continued)

*Primary Examiner* — Zahid Choudhury
(74) *Attorney, Agent, or Firm* — Finnegan, Henderson, Farabow, Garrett & Dunner, LLP

(57) ABSTRACT

A method and system for clock synchronization in an electronic device based on time based control is disclosed. The method includes comparing a current value of a cumulative phase difference between a signal generated by a device clock and a reference signal, with a reset threshold. The method further includes generating a control value, when the current value is greater than the reset threshold. Generating the control value includes computing a startup correction value based on a time lapsed after reset of the device clock, a dynamic correction value based on an accuracy factor, a clock constant, and a comparison of a current phase difference between with a high error threshold, and computing the control value based on the startup correction value, the dynamic correction value, and the current value of the cumulative phase difference. The method includes adjusting a frequency of the device clock based on the control value.

21 Claims, 8 Drawing Sheets

(56) References Cited

U.S. PATENT DOCUMENTS

| | | | | |
|---|---|---|---|---|
| 2003/0123597 | A1* | 7/2003 | Cho | G11C 7/1051 375/376 |
| 2004/0150440 | A1* | 8/2004 | Idei | G11C 7/222 327/141 |
| 2006/0132190 | A1* | 6/2006 | Driediger | G01R 23/10 327/47 |
| 2006/0174153 | A1* | 8/2006 | Dawson | G11C 7/22 713/600 |
| 2009/0323457 | A1* | 12/2009 | Shori | G11C 7/1012 365/233.1 |
| 2010/0171534 | A1* | 7/2010 | Kanayama | H03L 7/18 327/156 |
| 2016/0132072 | A1* | 5/2016 | Birrittella | G06F 1/12 713/400 |
| 2017/0220662 | A1* | 8/2017 | Barton | H04L 29/0854 |

OTHER PUBLICATIONS

Nicholls, C.W.T., “Adapative OCXO Drift Correction Algorithm”, IEEEE International Ultrasonics, Ferroelectronics, and Frequency Control Joint 50th Anniversary Conference, 2004, pp. 509-517.

http://www.beis.de/Elektronik/DeltaSigma/DeltaSigma.html, “An Introduction to Delta Sigma Converters”, 2007, 11 pages.

* cited by examiner

METHOD AND SYSTEM FOR CLOCK SYNCHRONIZATION BASED ON TIME BASED CONTROL

TECHNICAL FIELD

This disclosure relates generally to clock synchronization and more particularly to method and system for clock synchronization based on time based control.

BACKGROUND

Most communication equipment and devices use a high accuracy device clock to achieve accurate synchronization with each other to enable effective undisrupted near real-time communication. This kind of synchronization is achieved with the help of a master reference clock and control mechanisms implemented within the device clock. In general, a Phase Locked Loop (PLL) based control mechanism is in place on a master device to control the device clock based reference signal, in order to keep the expected clock out frequency. Additionally, such a PLL technique requires the communication network elements to be synchronized to avoid communication disruptions, which may occur due to frame drops, defective frame size, and interference issues on radio frequency links. Further, the synchronization requirements may vary depending on the type of network communication, standards adoption and, synchronization mechanisms, such as, frequency, phase, and time synchronization. Also, the accuracy variation limit for each of these synchronizations also varies across the networks and mode of communications, depending on the applications.

However, the device clock experiences a time/frequency deviation over a time due to aging and temperature impacts. This results in slow deviations in frequency of the device clock within a communication equipment and devices. These deviations are non-linear and are hard to predict immediately. Also, most of the existing conventional synchronization correction control mechanisms have various limitations. For example, there may be possible variations in the reference master signals, i.e., different master references may have different intensity of variations. Hence, variations in the reference master signals need to be filtered out to maximum by considering the master reference accuracy to determine an accurate error. In another example, the speed of correction needs to be controlled in a judicious manner based on the current observed error and the synchronization situation. During startup of an equipment or device, the error in frequency out of the device clock may be high and may need to be corrected faster in order to achieve quick convergence with the master reference. The magnitude and speed of correction may also depend on the type of device clock used in the device. Hence a device clock with high Clock Accuracy Factor (CAF) or with a lesser drift value usually needs to be corrected less often than a device clock that has less CAF.

In a convention mechanism, All Digital Phase-Locked Loop (ADPLL) based clock correction is provided. The efficiency of a DPLL/ADPLL is primarily determined by the precision (required amount of correction) of the correction applied to the device clock and the lead time (number of cycles) it takes for the device clock to converge to the expected frequency. However, variation in master reference signal may impact the efficiency of correction. Also, determination of a control value based on previous control values alone may impact the efficiency as well due to over/under corrections. This conventional mechanism does not take a type associated with the master reference signal into consideration and unwanted effect/error due to variations of master reference signal may not be properly nullified (filtered) without filtering the variations. For example, the master reference signal accuracy from different Global Positioning System (GPS) modules may be different, similarly the master reference signal accuracy of GPS is different from that of Synchronous Ethernet (SyncE). Hence a constant filter mechanism may be inefficient here. Also, the conventional mechanism discloses determination of the control value by subtracting previous control values. This may sometimes result in under/over-correction, if the prior control values happens to be relative higher or smaller in magnitude than the current control value.

In another conventional mechanism, efficiency issues are addressed by computing the correction value. However, this conventional mechanism fails to disclose the mechanism used to decide whether the correction is needed at any given moment to the device clock or not. The correction thus tries to overshoot the desired device clock frequency over time. This happens due to the fact that the decision for correction is always affirmative and the amount of correction depends on the averaged previous corrections. This may lead to instability in the system due to unwanted and/or inappropriate corrections.

In yet another conventional mechanism, correction of the device clock for temperature variations is provided. The method involves adding a derived value (from a current Digital Analog Converter (DAC) code and fixed/mid DAC value) to an accumulated error, When the derived value is greater than a pre-determined threshold, the final control value is incremented or decremented step by step. However, this conventional mechanism does not consider some aspects for a more efficient synchronization mechanism. The aspects include faster convergence to the master reference clock during startup and high error scenarios, applicability towards wider device clock types based on the CAF, and the reference signal accuracy for efficiently eliminating the variations in the reference signal.

Another conventional mechanism is based on Kalman filtering method, where deviations in the reference skew are filtered out. However, this conventional mechanism does not consider applicability of this method to different device clock accuracy types and the implementation of this filter is limited and complex due to multi-dimension matrix arithmetic involved.

SUMMARY

In one embodiment, a method of clock synchronization within an electronic device is disclosed. The method includes comparing a current value of a cumulative phase difference between a signal generated by a device clock in the electronic device and a reference signal generated by a master clock with a reset threshold. The method further includes generating a control value, when the current value is greater than the reset threshold. Generating the control value include computing a startup correction value based on the time lapsed after reset of the device clock, computing a dynamic correction value based on an accuracy factor associated with the device clock, a clock constant, and a comparison of a current phase difference between the signal and the reference signal with a high error threshold, computing the control value based on the startup correction value, the dynamic correction value, and the current value of the cumulative phase difference. The method includes adjusting the frequency of the device clock based on the control value.

In another embodiment, a system for clock synchronization within an electronic device is disclosed. The system includes a processor and a memory operatively coupled to the processor, wherein the memory includes processor instructions, which when executed by the processor, cause the processor to compare a current value of a cumulative phase difference between a signal generated by a device clock in the electronic device and a reference signal generated by a master clock with a reset threshold. The processor instructions further cause the processor to generate a control value, when the current value is greater than the reset threshold. To generate the control value, the processor instructions are further configure to compute a startup correction value based on the time lapsed after reset of the device clock, compute a dynamic correction value based on an accuracy factor associated with the device clock, a clock constant, and a comparison of a current phase difference between the signal and the reference signal with a high error threshold, and compute the control value based on the startup correction value, the dynamic correction value, and the current value of the cumulative phase difference. The processor instructions cause the processor to adjust the frequency of the device clock based on the control value.

In yet another embodiment, a non-transitory computer-readable storage medium having stored thereon, a set of computer-executable instructions causing a computer comprising one or more processors to perform steps that include comparing a current value of a cumulative phase difference between a signal generated by a device clock in the electronic device and a reference signal generated by a master clock with a reset threshold. A control value may be generated, when the current value is greater than the reset threshold. Generating the control value includes computing a startup correction value based on the time lapsed after reset of the device clock; computing a dynamic correction value based on an accuracy factor associated with the device clock, a clock constant, and a comparison of a current phase difference between the signal and the reference signal with a high error threshold; and computing the control value based on the startup correction value, the dynamic correction value, and the current value of the cumulative phase difference. The frequency of the device clock may be adjusted based on the control value.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, explain the disclosed principles.

DETAILED DESCRIPTION

Figure 1:
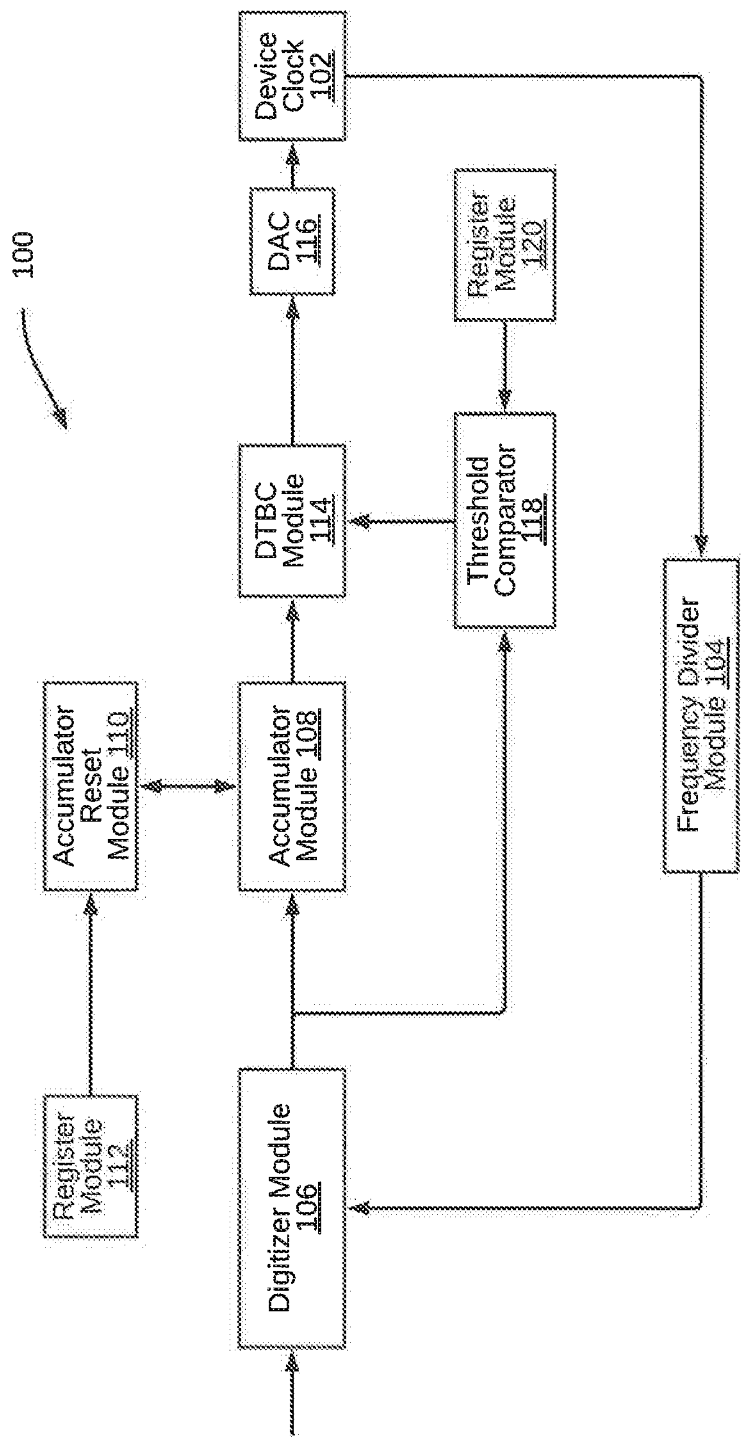
FIG. 1 illustrates a block diagram of a system for clock synchronization based on time based control, in accordance with an embodiment.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Additional illustrative embodiments are listed below. In one embodiment, a block diagram depicting various components of a system 100 for clock synchronization based on time based control is illustrated, in accordance with an embodiment. The system 100 includes a device clock 102 that is required to be synchronized based on time based control. The device clock 102 may be a voltage controlled oscillator. However, the device clock 102 may be of different types and may have different characteristics. To this end, a signal generated by the device clock at a particular frequency is received by a frequency divider module 104, which converts the signal (an input signal) into an output signal of a desired frequency. In an embodiment, the frequency of the input signal is an integral multiple of the output frequency, i.e., the desired frequency. In other words, the desired frequency may be higher or lower than the frequency of the signal generated by the device clock 102. The output signal generated by the frequency divider module 104 has the same phase as the input signal. In an embodiment, the frequency divider module 104 may generate a Lower Order Processed Oscillator sample signal (LO-POS) by dividing an oscillator sample signal (received from the device clock 102) to a low order value. Alternatively, the frequency divider module 104 may generate a Higher Order Processed Oscillator sample signal (HO-POS) by multiplying the oscillator sample signal to a high order value.

The output signal is then received by a digitizer module 106. The digitizer module 106 instantaneously determines one or more of a phase difference and a frequency difference between a reference signal and the output signal generated by the frequency divider module 104. The digitizer module 106 determines the phase difference in a periodic manner after a predefined time interval. The reference signal is generated by a master clock, which may be more stable and reliable, when compared to the device clock 102. The phase difference is determined in order to synchronize or tune the device clock 102 with the reference signal. The digitizer module 106 computes a phase difference (or phase error) between the output signal (associated with the device clock 102) and the reference signal. The phase difference may be represented in the units of nanoseconds. The phase difference is the deviation of the output signal with respect to the reference signal at a given time instance. The digitizer module 106 then converts a current phase difference into a numeric digital value. The numeric digital value is then passed on to an accumulator module 108.

The accumulator module 108 retains at least one prior phase difference between the output signal and the reference signal. Each of the at least one prior phase difference may be stored as a corresponding prior numeric digital value. When the accumulator module 108 receives the current phase difference in the form of the numeric digital value, the accumulator module 108 adds the current phase difference with the at least one prior phase difference to obtain a cumulative phase difference. The accumulator module 108 iteratively performs the addition of current and prior phase difference, until a reset signal is received from an accumulator reset module 110. The accumulator reset module 110 generates a reset signal when the cumulative phase difference is greater than a reset threshold. In an exemplary embodiment, the reset threshold may be derived from a Reference Accuracy Configuration (RAC) of the reference signal. The RAC is the maximum phase variation expected for the reference signal. The RAC may be known to the operator and may be obtained from device specifications in case the reference signal is generated as a device out. A register module 112 may stores the configured value of the RAC. The reset threshold may be determined using equation 1 given below:

$$\text{Reset Threshold}=1.1*RAC \quad (1)$$

By way of an example, when the RAC of the reference signal has phase variation as +/−100 ns, then the reset threshold would be 110 ns. The value of reset threshold is set slightly more than the RAC to ensure that the deviations in the reference signal are filtered out. In an embodiment, when the value of the RAC is not known, the value of the RAC may be taken as 30 ns. This value is determined based on the mostly observed 1 PPS accuracy Root Mean Square (RMS) deviation for an ordinary Global Positioning System (GPS) module. The accumulator reset module 110 is further explained in detail in conjunction with FIG. 2.

When the reset signal is received by the accumulator module 108, the value of the cumulative phase difference at the time of receiving the reset signal is shared with a Dynamic Time Based Control (DTBC) module 114. Additionally, the value of cumulative phase difference at the accumulator module 108 is reset to zero. In other words, in a subsequent iteration, the phase difference may start accumulating again at the accumulator module 108, starting from zero.

Figure 5:
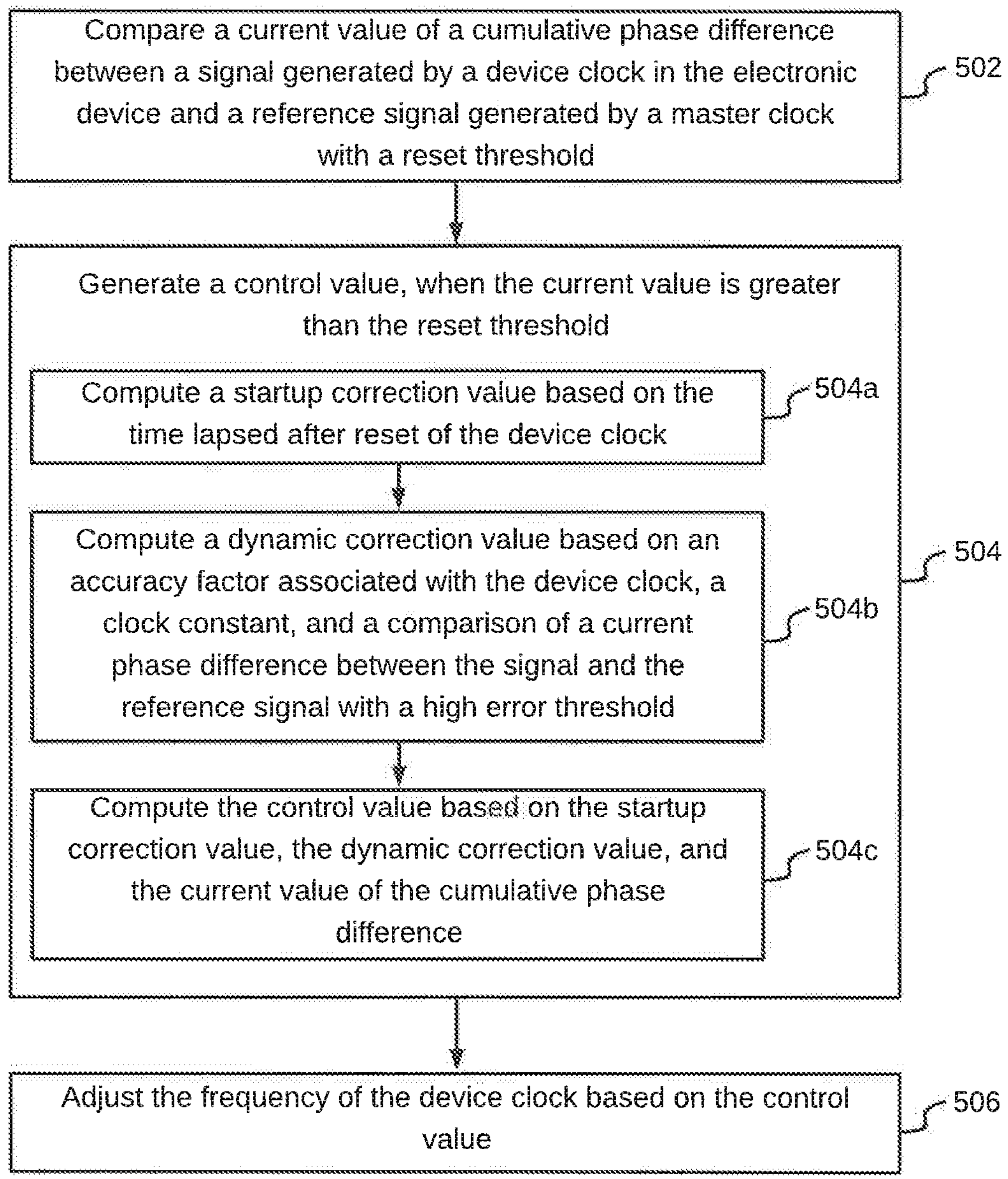
FIG. 5 illustrates a flowchart of a method for synchronizing a device clock within an electronic device, in accordance with an embodiment.

The DTBC module 114 may be a dynamic correction controller that has a digital loop control mechanism, which generates a control value based on the cumulative phase difference received from the accumulator module 108. The control value may be represented in units of Parts Per Billion (PPB). It will be apparent to a person skilled in the art that the control value may be represented in other units. The DTBC module 114 may filter out unnecessary frequency deviations or noise. The DTBC module 114 may further include a Startup Correction Controller (SCC) (not shown in FIG. 1) and an Operation Correction Controller (OCC) (not shown in FIG. 1). The SCC computes a startup correction value based on the time lapsed after last reset of the device clock 102. In other words, the startup correction value is computed to offset the high phase error generated during startup of the device clock 102, This is further explained in detail in conjunction with FIG. 2. On the other hands the OCC computes a dynamic correction value that is used to filter out unnecessary correction and apply a faster correction, if a current phase difference between the output signal (associated with the device clock 102) and the reference signal is high. The DTBC module 114 may compute the control value based on the startup correction value and the dynamic correction value. This is further explained in detail in conjunction with FIG. 2 and FIG. 5.

The DTBC module 114 sends the control value to a digital to analog converter 116 that is associated with the device clock 102. The digital to analog converter 116 then converts the provided control value into a corresponding voltage, which is used by the device clock 102 adjust its frequency. As a result, the device clock 102 is synchronized with the reference signal received from the master clock.

In an embodiment, the system 100 may include a threshold comparator 118, which compares the current phase difference between the output signal of the device clock 102 and the reference signal, with a high error threshold. The current phase difference is sent to the threshold comparator 118 by the digitizer module 106. The high error threshold is preconfigured in the system 100. When the current phase difference is greater than the high error threshold, the threshold comparator 118 generates a high error signal towards the DTBC module 114. The high error threshold may be determined based on the Clock Accuracy Factor (CAF). The CAF may be the amount of frequency drift produced by the device clock 102 when it is free running. The CAF may be defined as PPB/day. The CAF or the clock drift per day may be available in specifications provided by manufacturer of the device clock 102. The CAF may range from 2 PPB/24 hrs to 5000 PPB/24 hrs. The high error threshold may be determined using equation 2 given below:

$$\text{High Error Threshold}=1+In(CAF) \quad (2)$$

For example, when the CAF is 50 PPB, then high error threshold is ~5 nanosecond (ns). The value of the CAF may be stored in a register module 120 that is operatively coupled to the threshold comparator 118.

The system 100 may include a processor (not shown in FIG. 1) that is operatively coupled to a memory (not shown in FIG. 1). The memory may store a set of processor instruction or algorithm, which when executed by the processor enables clock synchronization based on time based control. The memory stores instructions for the processor, which, on execution, causes the processor to perform desired operations. The memory may be a non-volatile memory or a volatile memory. Examples of the non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM).

The system 100 may be implemented in a variety of computing systems, which may include, but are not limited to Long Term Evolution (LTE)-eNodeB, smartphone, a dedicated handheld device, Internet of Things (IoT) devices, a tablet, a laptop, or a server. The system 100 may further be adapted to exchange data with other components or service provider using a network (not shown in FIG. 1). The network may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

Figure 2:
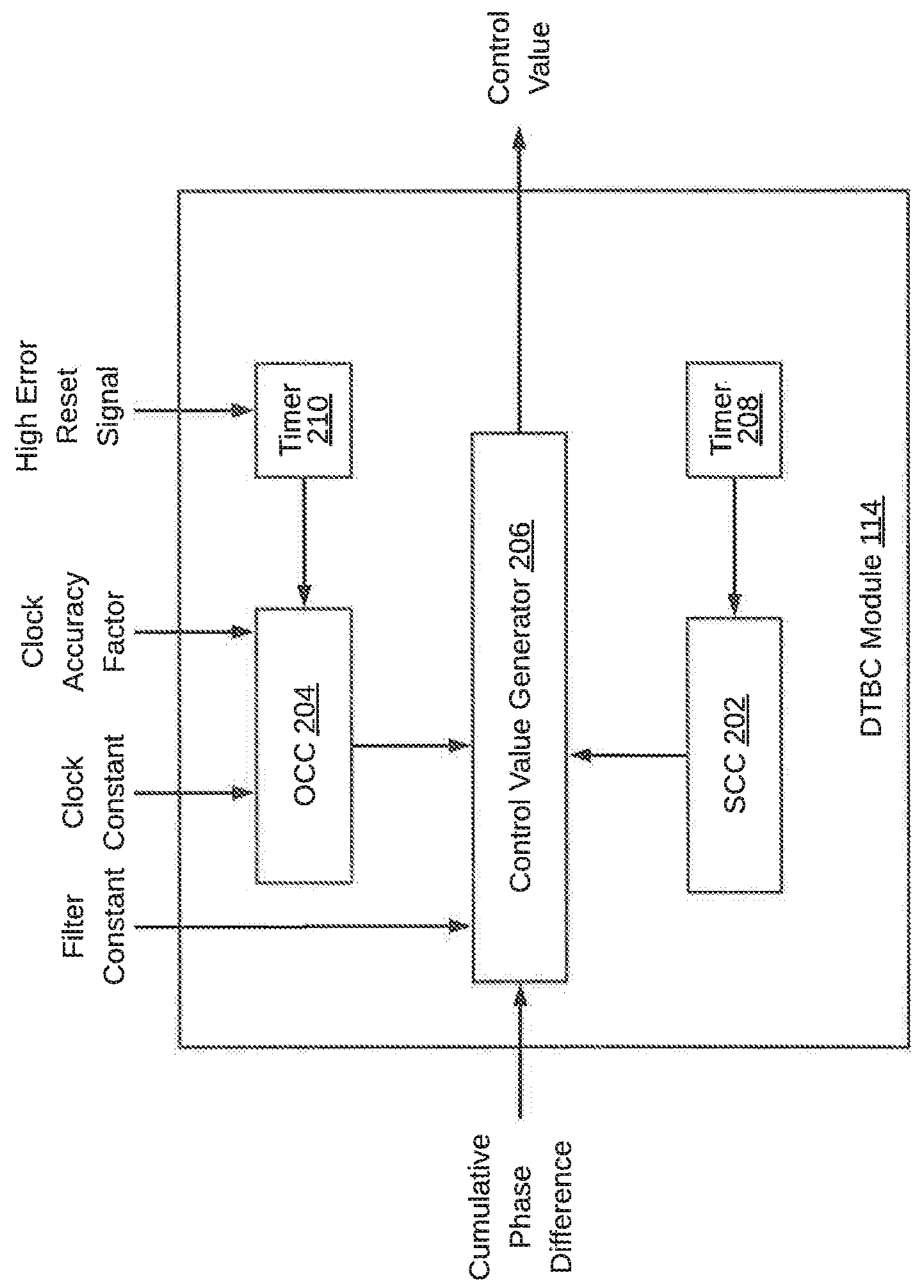
FIG. 2 illustrates a block diagram depicting various components of a Dynamic Time Based Control (DTBC) module within a system for clock synchronization, in accordance with an embodiment.

Referring now to FIG. 2, a block diagram depicting various components of the DTBC module 114 within the system 100 is illustrated, in accordance with an embodiment. The DTBC module 114 includes an SCC 202, an OCC 204, and a control value generator 206. The SCC 202 computes a startup correction value based on the time lapsed after last reset of the device clock 102. To this end, the SCC 202 is operatively coupled to a timer 208 that outputs the time since last reset of the device clock 102. The timer 208 increments by 1 every second and stat value after a reset is equal to 1. In an embodiment, the startup correction value may be computed using the equation 3 given below:

$$SCV = \sqrt{\ln(T+1)} \tag{3}$$

where,

SCV is the startup correction value; and

T is the time lapsed since the last restart (cold boot) of the device clock.

The startup correction value has a higher impact on the control value during the start-up period of the device clock 102. This is because, as the time proceeds, the device clock 102 may get more stable.

The OCC 204 computes a dynamic correction value that is used to filter out unnecessary correction and apply a faster correction, if a current phase difference between the output signal (associated with the device clock 102) and the reference signal is very high. The dynamic correction value may be computed using equation 4 given below:

$$DCV = \frac{2^{\frac{\sqrt{t}}{2}}}{2^{\frac{\sqrt{t}}{2}} + \ln(CAF) + CC} \tag{4}$$

where,

DCV is the dynamic correction value;

CAF is the clock accuracy factor or the clock drift per day, which should be available in specifications provided by manufacturer of the device clock 102. The CAF may range from 2 PPB/24 hrs to 5000 PPB/24 hrs;

CC is a clock constant that is applicable for the device clock 102. The value of CC is 730; and t is the time period lapsed after receiving a high error signal, which is generated when the phase difference between the output signal of the device clock 102 and the reference signal is greater than a high error threshold.

A timer 210 operatively coupled to the OCC 204 outputs the time elapsed, i.e., 't,' after receiving a preceding high error signal, The timer 210 increments in every second and the start or reset value is equal to 1. The timer 210 is reset when a high error signal is received. Generation of the high error signal is further explained in detail in conjunction with FIG. 4.

The control value generator 206 computes the control value based on the startup correction value, the dynamic correction value, and the current value of the cumulative phase difference between the output signal generated by the device clock 102 and the reference signal. In an embodiment, the control value may be computed using the equation 5 given below:

$$CV = \frac{CPD}{FC * SCV * DCV} \tag{5}$$

where,

CV is the control value;

CPD is the cumulative phase difference; and

FC is a filter constant and the numeric value is equal to 667. This is applicable to a device clock with the CAF range from 2 PPB/24 hrs to 5000 PPB/24 hrs;

SCV is the startup correction value; and

DCV is the dynamic correction value.

For the SCV, referring back to equation 3 and 5, when T increases, value of the SCV increases in magnitude. Thus, the damping of the CV due to the SCV increases and further converges to almost higher constant value, thereby reducing the correction rate. This avoids unnecessary jitter due to over correction. Thus, during the start of the device clock 102, the SCC 202 enables for faster correction and quick synchronization of the device clock 102 with the reference signal of the master clock.

For the DCV, referring back to equations 4 and 5, if value of the CPD is high and the value to 't' is short, then the OCC 204 enables faster correction of the device clock 102, as the value of 't' tends to a lower value.

A comparatively high phase difference for the device clock 102 with respect to the reference signal may be possible during start of the device clock 102. After an initial higher correction because of the high phase difference, as time passes, the device clock 102 stabilizes. In other words, the correction frequency and the magnitude of the correction, i.e., the control value reduces as the device clock 102 stabilizes. This is because once the device clock 102 has stabilized, the value of phase difference will be low in magnitude and the DCV tends towards a higher value as time passes, i.e., as the value of 't' increases.

In an embodiment, once the device clock 102 has stabilized, further phase difference between the output signal of the device clock 102 and the reference signal as detected by the digitizer module 106 may be due to connectivity issues of the master clock rather than deviations in the device clock 102. This phase difference which occurs due to connectivity issues of the master clock needs to be filtered out. Thus, the rate of correction of the device clock 102 is low as time progresses. In another embodiment, when the threshold comparator 118 detects a high phase difference during the operation of the device clock 102, the threshold comparator 118 triggers a faster correction by resetting value of 't' in the equation 3 to '1'.

Thus, in the system 100, a control value is generated towards the device clock 102 in order to control frequency generated by the device clock 102 with the judicial involvement of the SCC 202 and the OCC 204. During the startup period of the device clock 102, when error in the device clock 102 is larger with respect to the reference signal, both the SCV and the DCV are lower in magnitude and damps less. This enables a larger control value to be generated for a faster correction with larger magnitude. As a result, the device clock 102 achieves faster convergence with the reference signal.

Further, when the device clock 102 is synchronized and stable with respect to the reference signal, i.e., when the error in the device clock is comparatively low, then the OCC 204 has significant control of the control value. Also based on the magnitude of the error in the device clock 102, damping factor caused by the OCC 204 may vary. Thus, in the system 100, the SCC 202 and the OCC 204 are aligned in order to have optimal filtering or damping based on the values of 'T' and 't' as described in equations 3 and 4.

Figure 3:
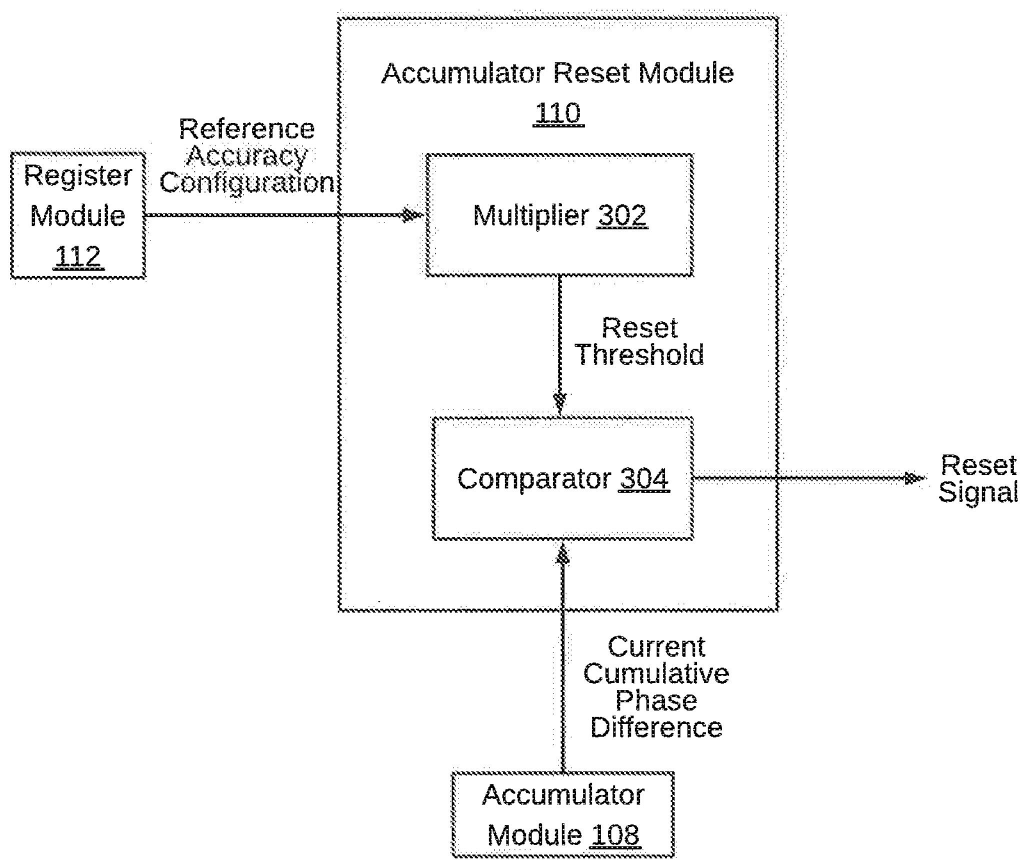
FIG. 3 illustrates a block diagram depicting various components of an accumulator reset module within a system for clock synchronization, in accordance with an embodiment.

Referring now to FIG. 3, a block diagram depicting various components of the accumulator reset module 110 within the system 100 is illustrated, in accordance with an embodiment. The accumulator reset module 110 includes a multiplier 302 that is operatively coupled to a comparator 304. The multiplier 302 is further operatively coupled to the register module 112 that provided the value of the RAC to the multiplier 302, Based on the value of the RAC, the multiplier 302 derives the value of a reset threshold. The reset threshold may be derived using equation 1 given in the description of FIG. 1.

The comparator 304 receives the value of reset threshold from the multiplier 302. The comparator 304 further receives the cumulative phase difference from the accumulator module 108. Thereafter, the comparator 304 compares the cumulative phase difference with the reset threshold. When the cumulative phase difference is greater than the reset threshold, the comparator 304 generates a reset signal and instructs the accumulator module 108 to send the cumulative phase difference to the DTBC module 114. In case the cumulative phase difference is less than the reset threshold, the comparator 304 does not generate a reset signal. As a result, the accumulator module 108 does not send the cumulative phase difference to the DTBC module 114. Additionally, based on the reset signal, the accumulator module 108 resets the value of the cumulative phase difference to zero.

Figure 4:
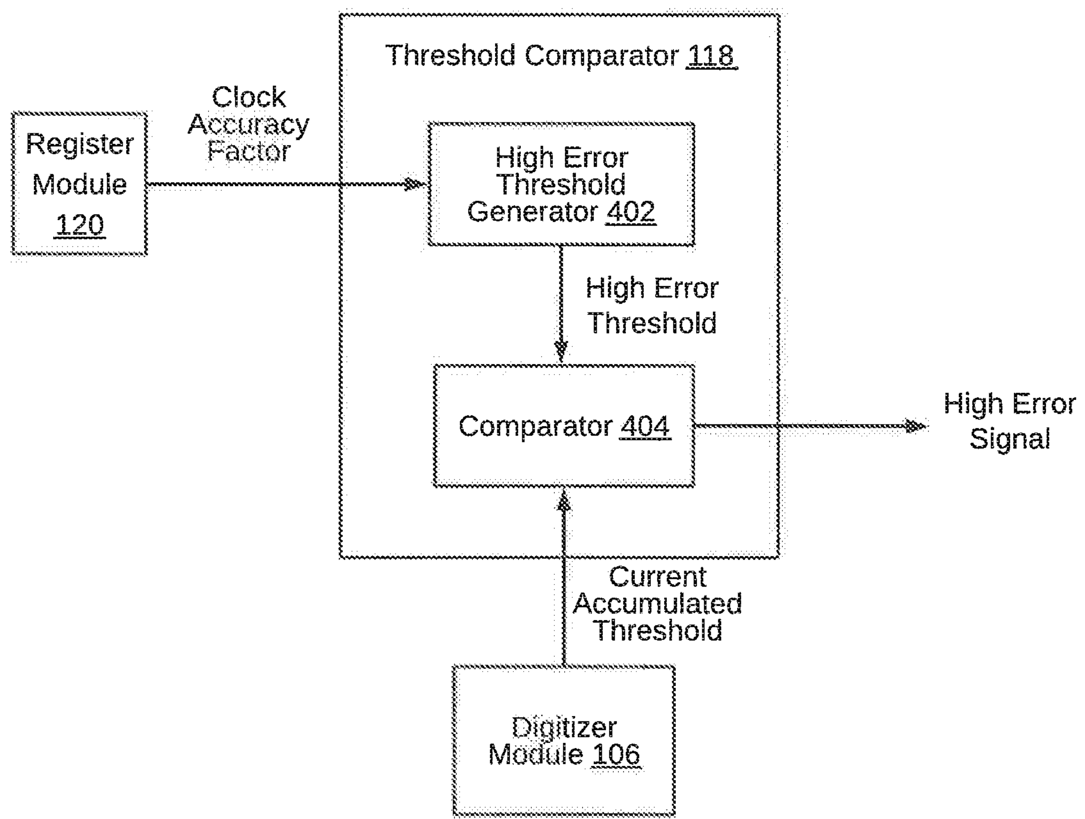
FIG. 4 illustrates a block diagram depicting various components of a threshold comparator within a system for clock synchronization, in accordance with an embodiment

Referring now to FIG. 4, a block diagram depicting various components of the threshold comparator 118 within the system 100 for clock synchronization is illustrated, in accordance with an embodiment. The threshold comparator 118 includes a high error threshold generator 402 that is operatively coupled to a comparator 404. The high error threshold generator 402 is further operatively coupled to the register module 120 that shares the CAF with the high error threshold generator 402. Based on the value of the CAF, the high error threshold generator 402 derives the value of a high error threshold. The high error threshold may be derived using equation 2 given in the description of FIG. 1.

The comparator 404 receives the value of high error threshold from the high error threshold generator 402. The comparator 404 further receives the current phase difference from the digitizer module 106. Thereafter, the comparator 404 compares the current phase difference with the high error threshold. When the current phase difference is greater than the high error threshold, the comparator 404 generates a high error signal toward the DTBC module 114. The high error signal influences the computation of DCV at the DTBC module 114. This has been explained in detail in conjunction with FIG. 3, Referring now to FIG. 5, a flowchart of a method for synchronizing the device clock 102 within an electronic device is illustrated, in accordance with an embodiment. Examples of the electronic device may include, but are not limited to LTE-eNodeB, a smartphone, a dedicated handheld device, IoT devices, a tablet, a laptop, or a server. At step 502, a current value of a cumulative phase difference between a signal generated by the device clock 102 and a reference signal generated by a master clock is compared with a reset threshold. Thereafter, at step 504, a control value is generated, when the current value is greater than the reset threshold. This has been explained in detail in conjunction with FIG. 1 and FIG. 2. To generate the control value, at step 504*a*, a startup correction value is computed based on the time lapsed after reset of the device clock 102. In an embodiment, the startup correction value may be computed using the equation 3 given in the description of FIG. 2. At step 504*b*, a dynamic correction value is computed based on an accuracy factor associated with the device clock (which is the CAF), a clock constant, and a comparison of a current phase difference between the signal and the reference signal with a high error threshold. In an embodiment, the dynamic correction value may be computed using the equation 4 given in the description of FIG. 2.

Thereafter, at step 504*c*, the control value is computed based on the startup correction value, the dynamic correction value, and the current value of the cumulative phase difference. In an embodiment, the control value may be computed using the equation 5 given in the description of FIG. 1. Once the control value has been computed, the frequency of the device clock 102 is adjusted based on the control value at step 506. This has been explained in detail in conjunction with FIG. 1.

Figure 6:
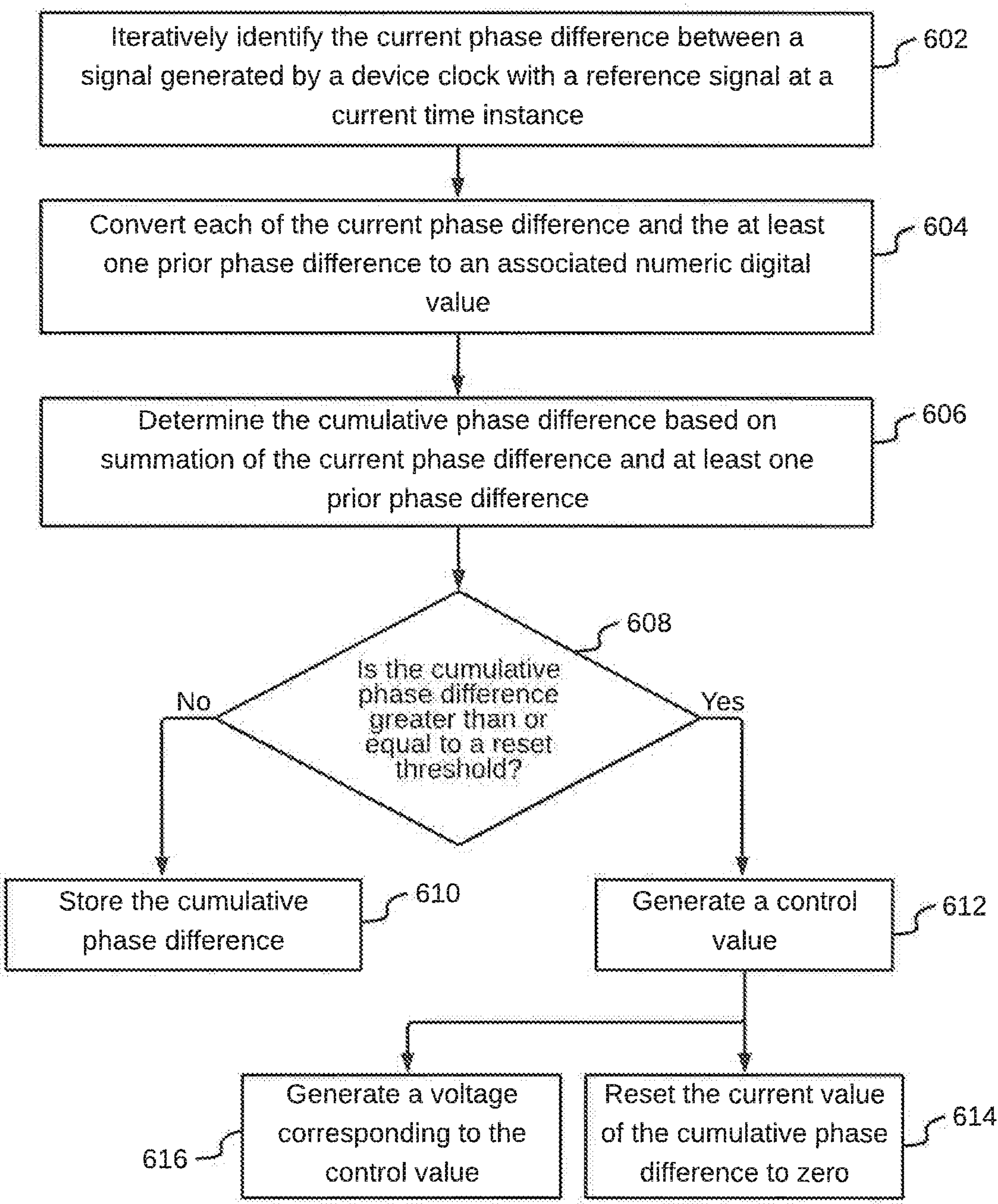
FIG. 6 illustrates a flowchart of a method for determining a frequency offset required for synchronizing a device clock, in accordance with an embodiment.

Referring now to FIG. 6, a flowchart of a method for determining a frequency offset required to synchronize the device clock 102 is illustrated, in accordance with an embodiment. At step 602, a current phase difference between a signal generated by the device clock with a reference signal generated by a master clock is iteratively determined/identified at a current time instance. At step 604, each of the current phase difference and at least one prior phase difference between the signal and the reference signal are converted to an associated numeric digital value in order to determine a cumulative phase difference. The at least one prior phase difference is periodically determined during one or more prior time instances.

At step 606, the cumulative phase difference is determined based on summation of numeric digital values associated with the current phase difference and the at least one prior phase difference. By way of an example, the current phase difference at time instance t1, t2, and t3, is P1, P2, and P3 respectively. Thus, at time instance t2, the cumulative phase difference is P1+P2, while at time instance t3, the cumulative phase difference is P1+P2+P3.

At step 608, a check is performed to determine whether the cumulative phase difference is greater than a reset threshold or not. If the cumulative phase difference is less than or equal to the reset threshold, the cumulative phase difference is stored at step 610, for example, in the accumulator module 108. Referring back to step 608, when the cumulative phase difference is greater than the reset threshold, a control value is generated at step 612. The generation of the control value has been explained in detail in conjunction with FIG. 5. Thereafter, at step 614, a voltage is generated corresponding to the control value. The frequency of the device clock 102 is adjusted based on the voltage. At step 616, the current value of the cumulative phase difference is reset to zero. This has been explained in detail in conjunction with FIG. 1 and FIG. 3.

Figure 7:
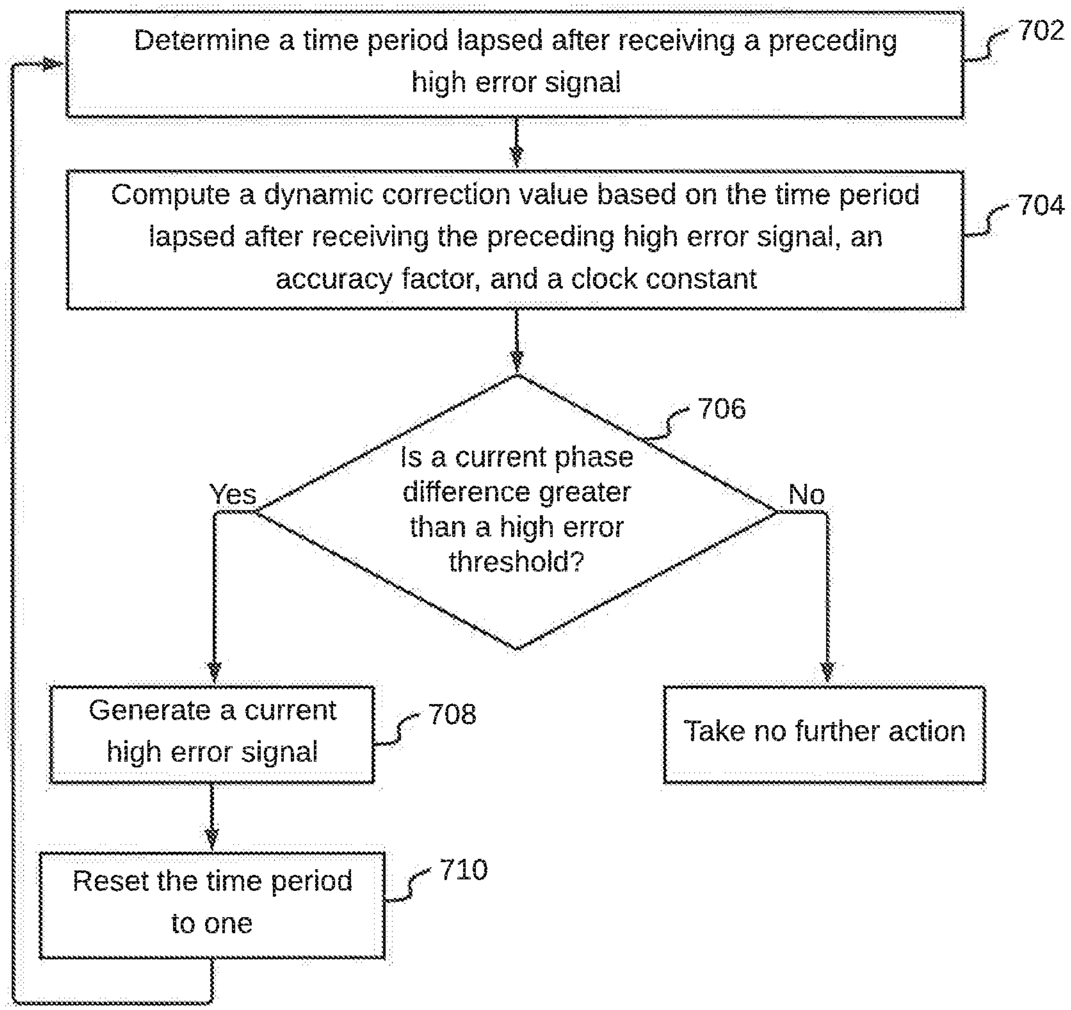
FIG. 7 illustrates a flowchart of a method for generating dynamic correction value used for synchronizing a device clock, in accordance with an embodiment.

Referring now to FIG. 7, a flowchart of a method for generating dynamic correction value used to synchronize the device clock 102 is illustrated, in accordance with an embodiment. At step 702, a time period lapsed after receiving a preceding high error signal is determined. At step 704, a dynamic correction value is computed based on the time period lapsed after receiving the preceding high error signal, an accuracy factor, and a clock constant. In an embodiment, the dynamic correction value may be computed using the equation 4 given in the description of FIG. 2.

At step 706, a check is performed to determine whether a current phase difference between an output signal generated by the device clock 102 is greater than a high error threshold. The high error threshold is determined based on an accuracy factor associated with the device clock 102. This has been explained in detail in conjunction with FIG. 1 and FIG. 4. When the current phase difference is less than or equal to the high error threshold, no further action is taken. However, when the current phase difference is greater than the high error threshold, a current high error signal is generated at step 708. The preceding high error signal immediately precedes the current high error signal. In other words, the current high error signal is generated next in sequence to the preceding high error signal. Thereafter, the time period is reset to one at step 710. The control then moves back to the step 702. This has already been explained in detail in conjunction with FIG. 1 and FIG. 4.

Figure 8:
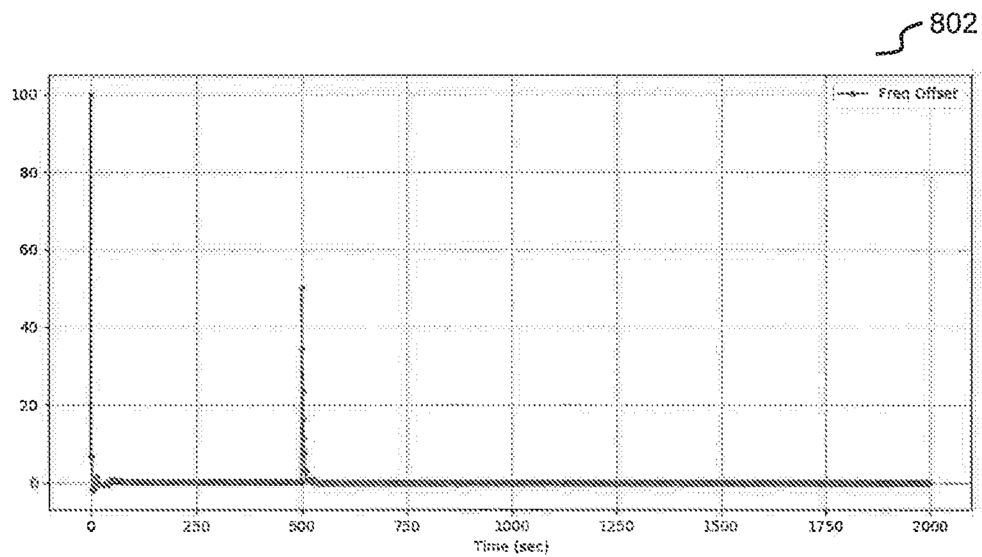
FIG. 8 illustrates a graph depicting a frequency offset required to synchronize a device clock and a graph depicting startup and dynamic correction values to be applied to determine the frequency offset, in accordance with an exemplary embodiment.
Figure 8:
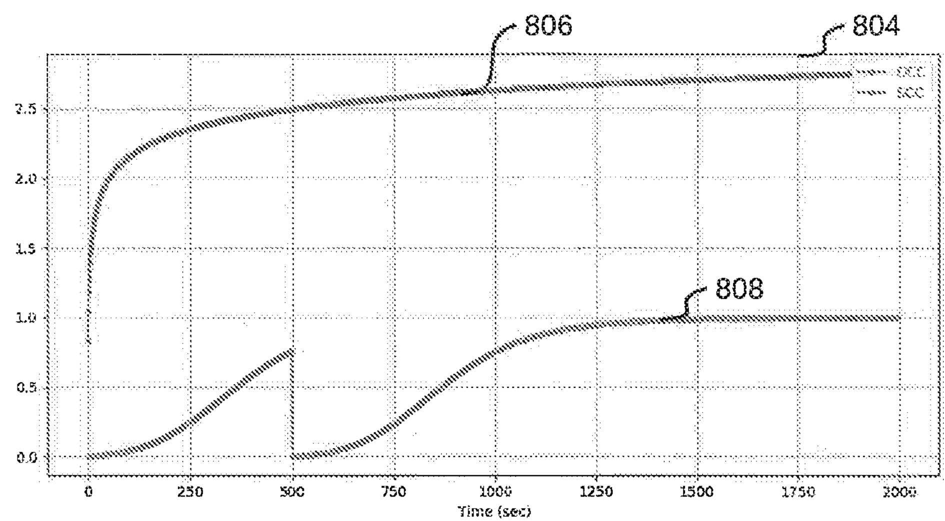

Referring now to FIG. 8, a graph 802 depicting a frequency offset in the device clock 102 and a graph 804 depicting startup and dynamic correction values to be applied to control the frequency offset are illustrated, in accordance with an exemplary embodiment. For this exemplary embodiment, following parameters are considered, the CAF of 5 PPB/day, DAC granularity of 0.192 PPB/step, master clock accuracy of 10 ns, CC (as given in equation 4) as 730, FC (as given in equation 5) of 667, initial frequency offset of 100 PPB, master clock jitter of 0 ns, an error in the device clock 102 of 50 ppb at 500 sec, which is simulated to 2000 sec.

The frequency offset of 50 PPB at 500 sec is depicted in the graph 802. Additional, based on the above parameters, the SCV value generated by the SCC 202 is depicted by a line 806 in the graph 804 and the DCV value generated by the OCC 204 is depicted by a line 808. The line 806 rises steeply at 0 seconds while the line 808 does not rise at all at 0 second, thereby indicating that effect of the SCV is high at startup of the device clock 102. As indicated by the graph 802, the frequency offset of 50 PPB is introduced at 500 seconds This frequency offset is immediately corrected as a result of the DCV value as indicated by the line 808. This correction corresponds to the high error signal generated by the threshold comparator 118, when the current phase difference between the output signal of the device clock 102 and the reference signal generated by the master clock is greater than a high error threshold. This has been explained in detail in conjunction with FIGS. 1 and 4.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide a method and system for clock synchronization based on time based control. In the provided method and system, the digitized value of phase difference of a device clock observed with respect to a reference signal of a master clock is added and filtered with an accumulator logic to avoid any jitter from the reference channel itself. The extent of filtering applied is determined based on reference accuracy of the reference channel specifications. Further, the filtered phase difference value is applied with two dynamic filters, which damps the filtered phase difference to a lower control value. These dynamic filters act in such a way that the damping impact on the phase difference is reduced during the startup or whenever the magnitude of phase difference is observed high above a threshold. During the start of the device clock, usually the phase difference may be on a higher side, thus this dynamic damping enables faster correction of the device clock and helps to converge with master frequency reference. Similarly, when the device clock is stable the variations observed will be mostly be induced by the reference channel rather than deviations of the device clock itself. Thus, the dampness is kept high. Since damping coefficients for this dynamic filter damping are determined from the clock accuracy or drift accuracy specified by the manufacturer, the extent of filtering is more accurate as determined and can be varied for different types of device clocks, In other words, filtering is set based on the clock type or the CAF associated with the clock.

The proposed mechanism implements a generic and a dynamic time-based control mechanism, which enables faster and accurate control for different types of device clocks that have wider ranges of operating accuracy under various dynamic conditions. A comparison of a signal generated by a device clock with respect to a reference signal is done in a periodic manner and periodic phase differences are accumulated. If the difference signal goes above a predefined threshold, then the accumulated phase difference is provided as input to the dynamic time-based control mechanism to judiciously generate a control value, that is used to control frequency out of the device clock. Further, the mechanism considers the accuracy of the reference signal and the device clock to generate the control value.

Further, most existing control mechanisms have same mode of correction technique irrespective of the intensity or the nature of error, i.e., correction control is not dynamic in nature with respect to the error detected. This solution limits the unnecessary correction of the device clock when synchronized and thus prevents unwanted jitter. This technique enables faster correction of the device clock during start up and during high error situations. Additionally, this technique removes the variation of the reference signal, based on the reference source accuracy, thus generating precise control value. This proposed method further achieves faster synchronization of the device clock with reference signal, as it quickly corrects the initial error, during startup of the device clock. The solution nullifies variations of the reference signal based on the reference signal accuracy range.

The specification has described a method and system for clock synchronization based on time based control. The illustrated steps are set out to explain the exemplary embodiments shown, and it should be anticipated that ongoing technological development will change the way functions are performed. Examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of clock synchronization within an electronic device, the method comprising:

comparing a current value of a cumulative phase difference between a signal generated by a device clock in the electronic device and a reference signal generated by a master clock with a reset threshold;

generating a control value, when the current value is greater than the reset threshold, wherein generating the control value comprises:

computing a startup correction value based on time lapsed after reset of the device clock;

computing a dynamic correction value based on an accuracy factor associated with the device clock, a clock constant, and a comparison of a current phase difference between the signal and the reference signal with a high error threshold; and computing the control value based on the startup correction value, the dynamic correction value, and the current value of the cumulative phase difference; and adjusting frequency of the device clock based on the control value.

2. The method of claim 1 further comprising:

iteratively identifying the current phase difference between the signal generated by the device clock with the reference signal at a current time instance; and determining the cumulative phase difference based on summation of the current phase difference and at least one prior phase difference between the signal and the reference signal, wherein the at least one prior phase difference is periodically determined during one or more prior time instances.

3. The method of claim 2 further comprising storing the cumulative phase difference, when the cumulative phase difference is less than the reset threshold.

4. The method of claim 2 further comprising converting each of the current phase difference and the at least one prior phase difference to an associated numeric digital value to determine the cumulative phase difference.

5. The method of claim 1 further comprising resetting the current value of the cumulative phase difference to zero, when the current value of the cumulative phase difference is greater than the reset threshold.

6. The method of claim 1 further comprising generating a voltage corresponding to the control value, wherein the frequency of the device clock is adjusted based on the voltage.

7. The method of claim 1, wherein computing the dynamic correction value comprises determining a time period lapsed after receiving a preceding high error signal.

8. The method of claim 7, wherein the dynamic correction value is computed based on the time period lapsed after receiving the preceding high error signal, the accuracy factor, and the clock constant.

9. The method of claim 7, further comprising generating a current high error signal when the current phase difference is greater than the high error threshold, wherein preceding high error signal immediately precedes the current high error signal.

10. The method of claim 9, further comprising resetting the time period to one in response to receiving the current high error signal.

11. The method of claim 1, wherein the high error threshold is determined based on an accuracy factor associated with the device clock.

12. A system of clock synchronization within an electronic device, the system comprising:

a processor; and a memory operatively coupled to the processor, wherein the memory comprises processor instructions, which when executed by the processor, cause the processor to:

compare a current value of a cumulative phase difference between a signal generated by a device clock in the electronic device and a reference signal generated by a master clock with a reset threshold;

generate a control value, when the current value is greater than the reset threshold, wherein to generate the control value, the processor instructions are further configure to:

compute a startup correction value based on a time lapsed after reset of the device clock;

compute a dynamic correction value based on an accuracy factor associated with the device clock, a clock constant, and a comparison of a current phase difference between the signal and the reference signal with a high error threshold; and compute the control value based on the startup correction value, the dynamic correction value, and the current value of the cumulative phase difference; and adjust a frequency of the device clock based on the control value.

13. The system of claim 12, wherein the processor instructions further cause the processor to:

iteratively identify the current phase difference between the signal generated by the device clock with the reference signal at a current time instance; and determine the cumulative phase difference based on summation of the current phase difference and at least one prior phase difference between the signal and the reference signal, wherein the at least one prior phase difference is periodically determined during one or more prior time instances.

14. The system of claim 12, wherein the processor instructions further cause the processor to store the cumulative phase difference, when the cumulative phase difference is less than the reset threshold.

15. The system of claim 12, wherein the processor instructions further cause the processor to convert each of the current phase difference and the at least one prior phase difference to an associated numeric digital value to determine the cumulative phase difference.

16. The system of claim 15, wherein the processor instructions further cause the processor to generate a current high error signal when the current phase difference is greater than the high error threshold, wherein a preceding high error signal immediately precedes the current high error signal.

17. The system of claim 12, wherein the processor instructions further cause the processor to reset the current value of the cumulative phase difference to zero, when the current value of the cumulative phase difference is greater than the reset threshold.

18. The system of claim 12, wherein to compute the dynamic correction value, the processor instructions further cause the processor to determine a time period lapsed after receiving a preceding high error signal.

19. The system of claim 18, wherein the dynamic correction value is computed based on the time period lapsed after receiving the preceding high error signal, the accuracy factor, and the clock constant.

20. The system of claim 19, wherein the processor instructions further cause the processor to reset the time period to one in response to receiving the current high error signal.

21. A non-transitory computer-readable storage medium having stored thereon, a set of computer-executable instructions causing an electronic device comprising one or more processors to perform steps comprising:

comparing a current value of a cumulative phase difference between a signal generated by a device clock in the electronic device and a reference signal generated by a master clock with a reset threshold;

generating a control value, when the current value is greater than the reset threshold, wherein generating the control value comprises:

computing a startup correction value based on a time lapsed after reset of the device clock;

computing a dynamic correction value based on an accuracy factor associated with the device clock, a clock constant, and a comparison of a current phase difference between the signal and the reference signal with a high error threshold; and computing the control value based on the startup correction value, the dynamic correction value, and the current value of the cumulative phase difference; and adjusting a frequency of the device clock based on the control value.

* * * * *